United States Patent
Beaudoin et al.

(10) Patent No.: US 10,644,559 B2
(45) Date of Patent: May 5, 2020

(54) SYSTEM COMPRISING A SHAFT EXTENDING THROUGH A PRINTED CIRCUIT BOARD FOR CONTROLLING A MOTOR ASSEMBLY

(71) Applicant: DISTECH CONTROLS INC, Brossard (CA)

(72) Inventors: Daniel Beaudoin, Chambly (CA); Charles Pelletier, St-Jean-sur-Richelieu (CA); Steve Lupien, Boucherville (CA); Pascal Gratton, Montreal (CA); Eric Lebrun, Brossard (CA); Eric Lapointe, Brossard (CA)

(73) Assignee: DISTECH CONTROLS INC., Brossard (CA)

( * ) Notice: Subject to any disclaimer, the term of this patent is extended or adjusted under 35 U.S.C. 154(b) by 388 days.

(21) Appl. No.: 15/225,106

(22) Filed: Aug. 1, 2016

(65) Prior Publication Data
US 2018/0034340 A1    Feb. 1, 2018

(51) Int. Cl.
*H02K 5/04*    (2006.01)
*H02K 7/00*    (2006.01)
*H02K 7/10*    (2006.01)
*H02K 5/02*    (2006.01)
*H02K 11/00*   (2016.01)

(52) U.S. Cl.
CPC .............. *H02K 5/04* (2013.01); *H02K 5/02* (2013.01); *H02K 7/003* (2013.01); *H02K 7/10* (2013.01); *H02K 11/0094* (2013.01)

(58) Field of Classification Search
CPC ....... H02K 11/0094; H02K 7/10; H02K 7/003
USPC .......................................................... 310/96
See application file for complete search history.

(56) References Cited

U.S. PATENT DOCUMENTS

| | | | |
|---|---|---|---|
| 2,511,727 A * | 6/1950 | Lohse | G05D 3/16 200/6 R |
| 3,206,561 A | 9/1965 | Fordeck | |
| 4,467,706 A * | 8/1984 | Batcheller | B01D 50/002 165/244 |
| 4,724,286 A | 2/1988 | Cummins | |
| 5,967,824 A | 10/1999 | Neal et al. | |
| 6,927,514 B2 | 8/2005 | Nesic | |
| 7,339,299 B2 * | 3/2008 | Sesita | H02K 5/10 310/154.01 |
| 8,330,064 B2 | 12/2012 | Ouyang | |
| 2004/0264060 A1 | 12/2004 | MacPherson | |
| 2008/0116758 A1 | 5/2008 | Sesita et al. | |
| 2009/0304175 A1 * | 12/2009 | Roos | H04Q 1/145 379/325 |
| 2010/0283332 A1 * | 11/2010 | Toukairin | B25F 5/008 310/50 |

(Continued)

*Primary Examiner* — Terrance L Kenerly
(74) *Attorney, Agent, or Firm* — RatnerPrestia (57) ABSTRACT

The present relates to a system comprising a housing, a motor assembly, a printed circuit board (PCB) and a shaft. The motor assembly is located inside the housing. The motor assembly comprises a control for alternatively engaging and disengaging a functionality of the motor assembly. The printed circuit board (PCB) is located inside the housing and defines an aperture for receiving the shaft. The shaft extends through the aperture of the PCB. A first end of the shaft is adapted for actuating the control of the motor assembly. A second end of the shaft extends through an opening in the housing and is adapted for receiving an actuator.

16 Claims, 5 Drawing Sheets

(56) References Cited

U.S. PATENT DOCUMENTS

2011/0060535 A1\* 3/2011 Arms .................. B60C 23/0411
702/34

\* cited by examiner

SYSTEM COMPRISING A SHAFT EXTENDING THROUGH A PRINTED CIRCUIT BOARD FOR CONTROLLING A MOTOR ASSEMBLY

TECHNICAL FIELD

The present disclosure relates to the field of environment control appliances comprising a Printed Circuit Board (PCB) and a motor assembly. More specifically, the present disclosure relates to a system comprising a shaft extending through a PCB for controlling a motor assembly.

BACKGROUND

An environment control appliance usually comprises a PCB hosting a plurality of electronic components. A front panel of the environment control appliance comprises one or more controls (e.g. one or more buttons, a touchscreen, etc.) allowing a user to interact with the environment control appliance, and to control at least some of the electronic components hosted by the PCB. The PCB is positioned in close vicinity to the front panel for facilitating interconnections between the one or more controls and the corresponding controlled electronic components.

Some environment control appliances also comprise a motor assembly, in addition to the PCB. Depending on the particular design of the environment control appliance, it may occur that the PCB is positioned between the motor assembly and the front panel, thus preventing an interconnection between the motor assembly and a specific control (e.g. a button) dedicated to a control of the motor assembly.

SUMMARY

According to a first aspect, the present disclosure provides a system comprising a housing, a motor assembly, a printed circuit board (PCB) and a shaft. The motor assembly is located inside the housing. The motor assembly comprises a control for alternatively engaging and disengaging a functionality of the motor assembly. The printed circuit board (PCB) is located inside the housing and defines an aperture for receiving the shaft. The shaft extends through the aperture of the PCB. A first end of the shaft is adapted for engaging and disengaging the control on the motor assembly. A second end of the shaft extends through an opening in the housing and is adapted for receiving an actuator.

According to a second aspect, the present disclosure provides a system comprising a housing, a motor assembly, a printed circuit board (PCB), a shaft and an actuator. The motor assembly is located inside the housing. The motor assembly comprises a control for alternatively engaging and disengaging a functionality of the motor assembly. The printed circuit board (PCB) is located inside the housing and defines an aperture for receiving a shaft. The shaft extends through the aperture of the PCB. A first end of the shaft is adapted for engaging and disengaging the control of the motor assembly. A second end of the shaft extends through an opening in the housing and is adapted for receiving an actuator. The actuator is affixed to the shaft.

According to a third aspect, the present disclosure provides a system comprising a housing, a motor assembly, a shaft and an actuator. The motor assembly is located inside the housing and comprises a control for alternatively engaging and disengaging a functionality of the motor assembly. The shaft inside the housing. A first end of the shaft is adapted for engaging the functionality of the motor assembly. A second end of the shaft extends through an opening in the housing and is adapted for receiving the actuator. The actuator is located substantially outside of the housing and is affixed to the shaft.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative examples thereof, given by way of example only with reference to the accompanying drawings.

The following terminology is used throughout the present disclosure:

PCB: A Printed Circuit Board is used in electronics to build electronic devices. The PCB is a board for mounting electrical and/or electronic components, and for providing electrical connection between the components.

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Motor assembly: A motor and related equipment such as for example: a clutch, a gear box, a calibration unit, servos, a power button, etc.

Various aspects of the present disclosure generally address one or more of the problems related to the control of a motor assembly located inside an appliance, the motor assembly being separated from the font panel of the appliance by a PCB.

Figure 1:
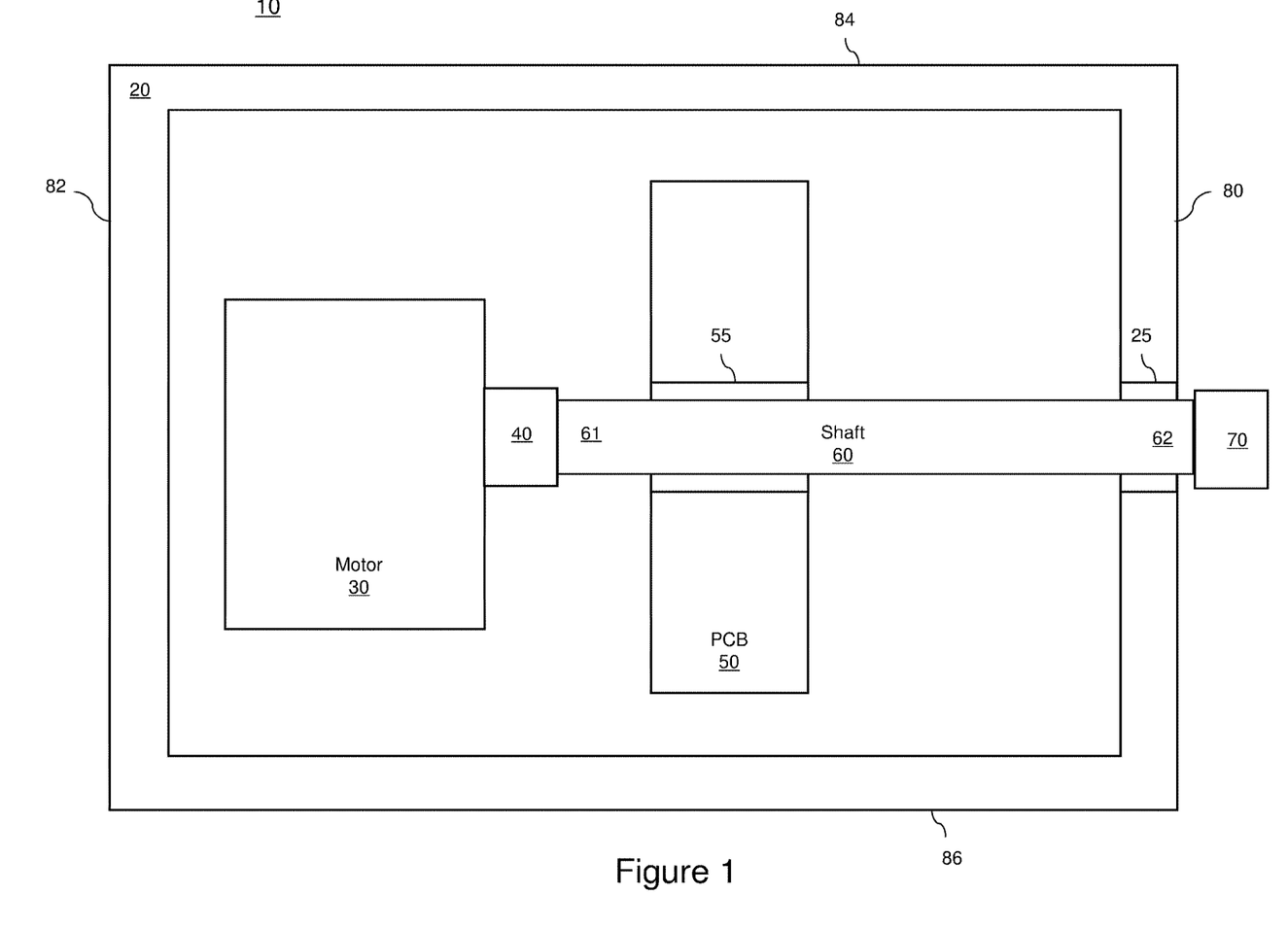
FIG. 1 represents a side elevation view of a system comprising a button and a shaft extending through a PCB for controlling a functionality of a motor assembly.
Figure 2:
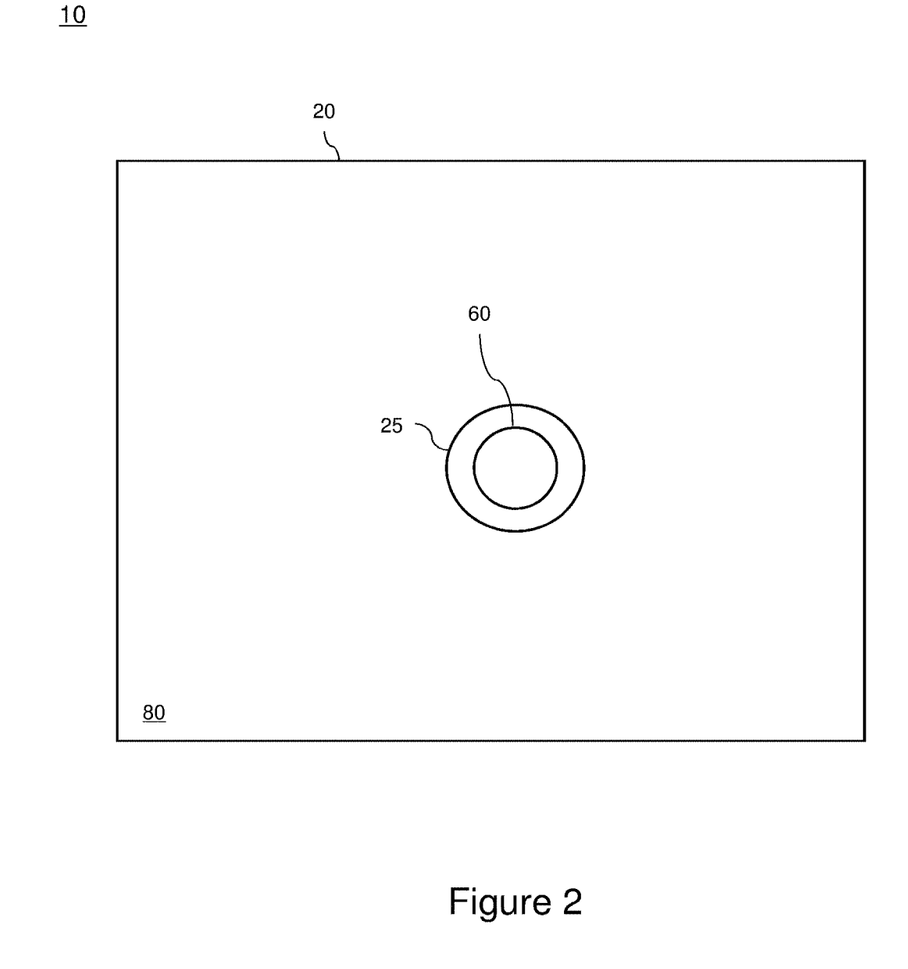
FIGS. 2, 3 and 4 represent a front elevation view of the system represented in FIG. 1.
Figure 3:
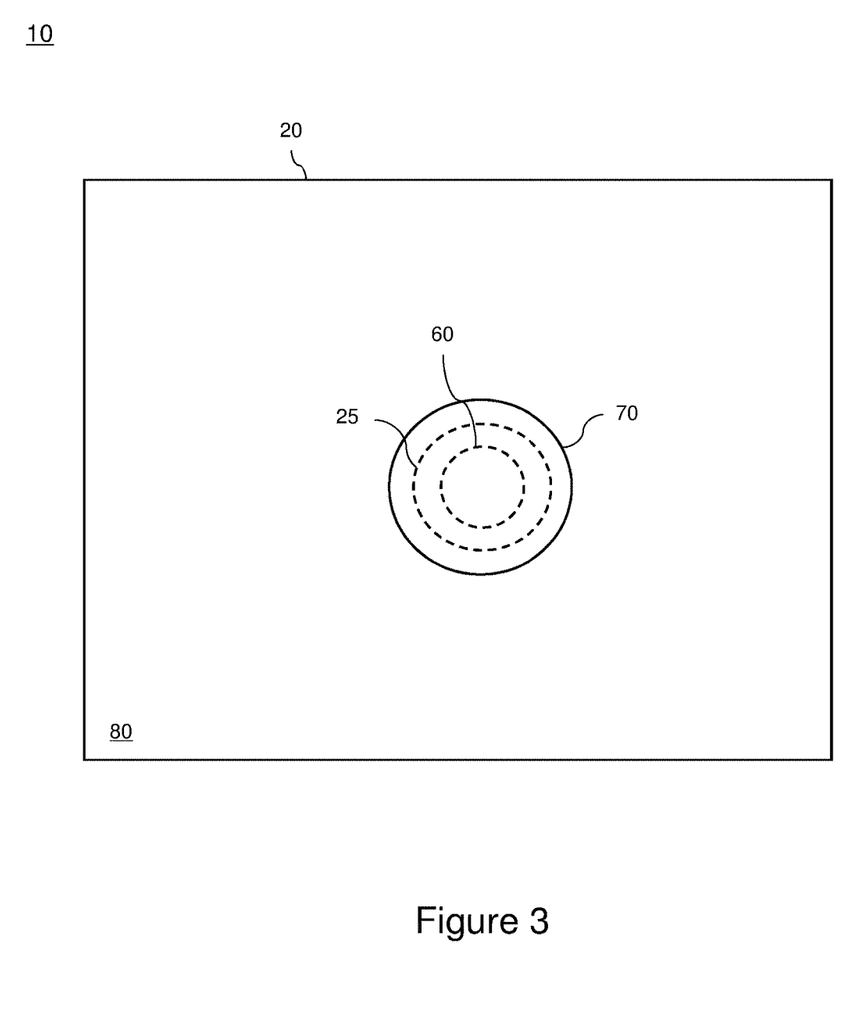
Figure 4:
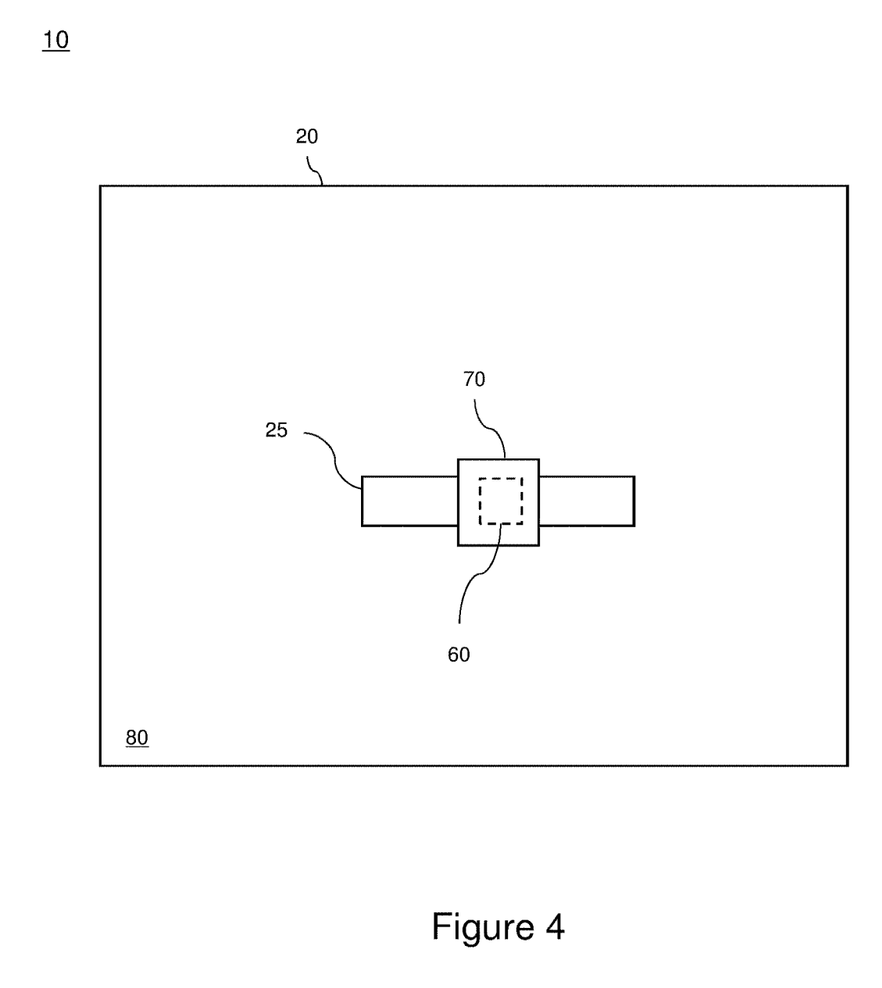
Figure 5:
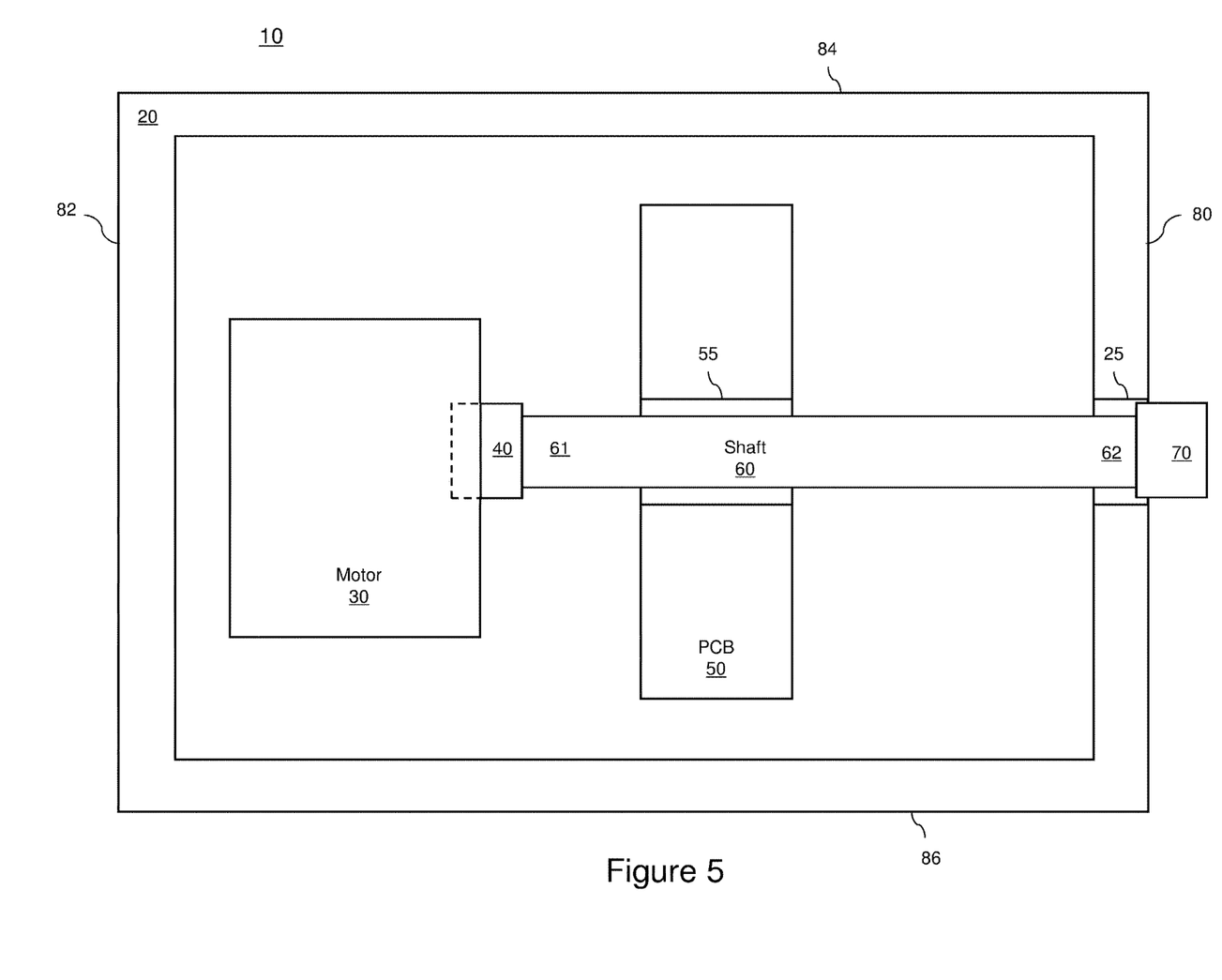
FIG. 5 represents a side elevation view of the system of FIG. 1 with the functionality of the motor assembly being engaged.

Referring now concurrently to example of FIGS. 1-5, a system 10 is represented. FIGS. 1 and 5 represent side elevation views of the system 10, while FIGS. 2, 3 and 4 represent front elevation views of the system 10.

The term "system" is used throughout the present disclosure to refer to any type of appliance that requires accessing a motor assembly through a PCB board, such as for example an environment control appliance, audio/video equipment, controlled pumps, a VAV appliance, etc.

The system 10 comprises a motor assembly 30 and a PCB 50 both located inside a housing 20 of the system 10. The shape and size of the system 10 is adapted for receiving the motor assembly 30 and the PCB 50 inside the housing 20. For illustration purposes, the system 10 represented in the Figures has sections having a substantially rectangular shape. The system 10 depicted in FIGS. 1-5 is not proportioned, but depicted so as to clearly convey an example of the system.

The PCB 50 supports a plurality of electrical and/or electronic components, such as one or more processing unit, one or more memory, an electrical power circuit, etc. (not represented in the Figures for simplification purposes).

The housing 20 of the system 10 has a front panel 80 comprising one or more controls for controlling the system 10. The one or more controls include an actuator 70 (for example a button) for controlling a functionality of the motor assembly 30. Although not represented in the Figures for simplification purposes, the front panel 80 may also include control(s) for controlling component(s) of the PCB 50. For example, a power control button on the front panel 80 controls the activation of the electrical power circuit of the PCB 50. In another example, a touchscreen allows a user to control functionalities implemented by a processing unit of the PCB.

The motor assembly 30 and the PCB 50 are secured to the housing 20 of the system 10 via proper means out of the scope of the present disclosure, and not represented in the Figures. For example, the motor assembly 30 is secured to a back panel 82 of the housing 20, and the PCB 50 is simultaneously secured to an upper panel 84 and a lower panel 86 of the housing 20.

As illustrated in FIG. 1, the PCB 50 is located between the motor assembly 30 and the front panel 80, preventing a direct control of the functionality of the motor assembly 30.

The PCB 50 defines an aperture 55 and the front panel 80 of the housing 20 comprises an opening 25. The aperture 55 and the opening 25 are respectively adapted for receiving a shaft 60.

The shaft 60 extends through the aperture 55 of the PCB 50. The shaft 60 has a first end 61 adapted for engaging or disengaging a control 40 of the motor assembly 30. The control 40 allows engaging or disengaging of motor assembly functionality such as for example: engaging a clutch (not shown), disengaging a clutch, engaging power of the motor assembly 30, disengaging power of the motor assembly 30, engaging setting an incremental value for the motor assembly 30, disengaging a set incremental value for the motor assembly 30, engaging setting an initial value for the motor assembly 30, disengaging a set initial value for the motor assembly 30, or any other type of functionality of a motor assembly.

In FIG. 1, the functionality of the motor assembly 30 is controlled through engaging or disengaging of the control 40 of the motor assembly 30. For instance, the first end 61 of the shaft 60 is secured to the control 40, and a movement of the shaft 60 (e.g. a longitudinal and/or a rotational movement) engages or disengages the control 40 of the motor assembly 30. The shaft 60 has a second end 62 extending through the opening 25 in the housing 20. The second end 62 of the shaft 60 is adapted for receiving the actuator 70.

FIG. 2 represents the system 10 without the actuator 70 affixed to the shaft 60, while FIGS. 3 and 4 represent the system 10 with the actuator 70 affixed to the shaft 60.

The shapes of the aperture 55 in the PCB 50, the opening 25 in the housing 20 and the shaft 60 may vary. For example, the aperture 55, the opening 25 and the shaft 60 all have a substantially cylindrical shape, as illustrated in FIGS. 2 and 3.

In a first example, pressing the actuator 70 disengages the control 40 of the motor assembly 30, while releasing the actuator 70 releases the control 40 which in turn engages the motor assembly 30. In this first example, the actuator 70 is a push button. The pressure applied on the actuator 70 is transmitted via the shaft 60 to the control 40 of the motor assembly 30 which disengages a clutch of the motor assembly 30. Release of the pressure applied on the actuator 70 is transmitted via the shaft 60 to the control 40 of the motor assembly 30, which engages a clutch of the motor assembly 30. Thus in this first example, the control 40 of the motor assembly 30 engages/disengages a clutch of the motor assembly 30.

FIG. 1 represents the actuator 70, the shaft 60 and the control 40 of the motor assembly 30 in a resting position. FIG. 5 represents the actuator 70, the shaft 60 and the control 40 of the motor assembly 30 while pressure is applied to the actuator 70 and the control 40 of the motor assembly 30 has disengaged the motor assembly 30. FIG. 1 also represents the actuator 70, the shaft 60 and the control 40 of the motor assembly 30 after the pressure on the actuator 70 has been released and the control 40 engages the motor assembly 30.

The actuator 70 is located outside of the housing 20 and the second end 62 of the shaft 60 extends partially outside of the housing 20, as illustrated in FIG. 1. Alternatively, the actuator 70 extends partially inside the opening 25 of the housing 20 and the second end 62 of the shaft 60 does not extend outside of the housing 20, as illustrated in FIG. 5.

Alternatively, pressing the actuator 70 engages the control 40 which engages the motor assembly 30, while releasing pressure on the actuator 70 disengages the control 40, which in turn disengages the motor assembly 30.

In another example, the interaction with the control 40 of the motor assembly 30 is performed by a rotation of the control 40 of the motor assembly 30. The actuator 70, the opening 25, the aperture 55 and the shaft 60 are designed for allowing a corresponding rotation of the actuator 70. For instance, the actuator 70, the opening 25, the shaft 60 (and the aperture 55) have a substantially cylindrical profile as illustrated in FIG. 3. A rotation applied to the actuator 70 is transmitted via the shaft 60 to the control 40 of the motor assembly 30, to control the functionality of the motor assembly 30. For example, a rotation of the control 40 of the motor assembly 30 triggered by a corresponding rotation of the actuator 70 alternatively engages or disengages the motor assembly 30, adjusts the motor assembly 30, controls a power level transmitted by the motor assembly 30, determines a value of step increments of the motor assembly 30, sets a speed of operation of the motor assembly 30, or performs any other functionality which can be performed by a control of a motor assembly.

In this particular example, the actuator 70 is a rotating button, which permits a rotation of the control 40 of the motor assembly 30 triggered by a corresponding rotation of the actuator 70, and thereby controlling the motor assembly 30. For example, the control 40 of the motor assembly 30 controls the motor assembly 30 by modifying a power transmitted by the motor assembly 30. The control 40 is rotated (continuously or in discrete incremental steps) to various positions corresponding to various values of the power to be transmitted by the motor assembly 30.

In yet another example, the interaction with the control 40 of the motor assembly 30 consists of a translation. The actuator 70, the opening 25, the aperture 55 and the shaft 60 are designed for allowing a corresponding translation of the actuator 70. FIG. 4 illustrates the actuator 70, the opening 25, the shaft 60 (and the aperture 55) being adapted for a horizontal translation of the actuator 70, which corresponds to a horizontal translation of the control 40 of the motor assembly 30. Alternatively, the actuator 70, the opening 25, the shaft 60 (and the aperture 55) are adapted for a vertical translation of the button 70 (not represented in the Figures), which corresponds to a vertical translation of the control 40 of the motor assembly 30. A combination of a horizontal and vertical translation may also be supported by the actuator 70, shaft 60 and control 40. A translation applied to the actuator 70 is transmitted via the shaft 60 to the control 40 of the motor assembly 30 to control a functionality of the motor assembly 30. For example, a translation of the control 40 of the motor assembly 30 triggered by a corresponding translation of the actuator 70 alternatively engages or disengages the corresponding functionality of the motor assembly 30. The control 40 of the motor assembly 30 is alternatively translated to a position corresponding to an engagement of the functionality of the motor assembly 30 and a position corresponding to a disengagement of the functionality of the motor assembly 30. In another example, a translation of the control 40 of the motor assembly 30 triggered by a corresponding translation of the actuator 70 modifies a power transmitted by the motor assembly 30. The control 40 of the motor assembly 30 is translated (continuously or in discrete incremental steps) to various positions corresponding to various values of the power to be transmitted by the motor assembly 30.

In yet another example, the control 40, the actuator 70 and the shaft 60 control concurrently plural functionalities of the motor assembly 30: engagement and/or disengagement of the power of the motor assembly 30, engagement and/or disengagement of the clutch of the motor assembly 30, controlling the power to be transmitted by the motor assembly 30, etc. To that effect, the control 40, the actuator 70 and the shaft 60 can be pushed, and further either translated or rotated.

The motor assembly 30 transmits one of the following to a controlled apparatus (not represented in the Figures): a torque or an electrical power. The controlled apparatus is generally independent form the system 10, but may also be integrated to the system 10. The torque is transmitted by the motor assembly 30 via a shaft, while the electrical power is transmitted via electrical cables(s). In the case of the transmission of electrical power, the motor assembly 30 may consist in an electrical transformer.

In a particular example, the system 10 consists of an environment control appliance for controlling one or more controlled devices dedicated to the regulation of the environment of a building. For example, the system 10 is a Variable Air Volume (VAV) control appliance for controlling one or more heating, ventilating, and/or air-conditioning (HVAC) system components operating in a VAV mode. For example, the motor 30 controls at least one valve of one of the following: a heating apparatus, a ventilating apparatus, an air conditioning apparatus, etc.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A system comprising:
   a housing comprising an opening;
   a motor assembly located inside the housing, the motor assembly comprising a control for alternatively engaging and disengaging a functionality of the motor assembly;
   a printed circuit board (PCB) located inside the housing and defining an aperture for receiving a shaft, the PCB comprising one or more central processing unit (CPU), one or more memory and an electrical power circuit;
   the shaft extending through the aperture of the PCB inside the housing, a first end of the shaft being adapted for actuating the control of the motor assembly, a second end of the shaft extending through the opening in the housing and being adapted for receiving an actuator; and
   the PCB being located between the motor assembly and the opening in the housing.

2. The system of claim 1 wherein the system is a Variable Air Volume (VAV) control system.

3. The system of claim 2, wherein the motor assembly controls at least one valve of: a heating apparatus, a ventilating apparatus, or an air conditioning apparatus.

4. The system of claim 1, wherein the motor assembly transmits one of a torque or an electrical power to a controlled apparatus.

5. A system comprising:
   a housing comprising an opening;
   a motor assembly located inside the housing, the motor assembly comprising a control for alternatively engaging and disengaging a functionality of the motor assembly;
   a printed circuit board (PCB) located inside the housing and defining an aperture for receiving a shaft, the PCB comprising one or more central processing unit (CPU), one or more memory and an electrical power circuit;
   the shaft extending through the aperture of the PCB inside the housing, a first end of the shaft being adapted for engaging or disengaging the control of the motor assembly, a second end of the shaft extending through the opening in the housing and being adapted for receiving an actuator;
   the actuator being affixed to the shaft; and
   the PCB being located between the motor assembly and the opening in the housing.

6. The system of claim 5, wherein a pressure applied on the actuator is transmitted via the shaft to the control of the motor assembly and disengages a functionality of the motor assembly.

7. The system of claim 6, wherein releasing pressure applied on the actuator is transmitted via the shaft to the control of the motor assembly and engages the functionality of the motor assembly.

8. The system of claim 5 wherein the system is a Variable Air Volume (VAV) control system.

9. The system of claim 8, wherein the motor assembly controls at least one valve of: a heating apparatus, a ventilating apparatus, or an air conditioning apparatus.

10. The system of claim 5, wherein the motor assembly transmits one of a torque or an electrical power to a controlled apparatus.

11. The system of claim 1, further comprising the actuator, the actuator being located substantially outside of the housing and being affixed to the shaft.

12. The system of claim 11, wherein pressure applied on the actuator is transmitted via the shaft to the control of the motor assembly and disengages the functionality of the motor assembly.

13. The system of claim 12, wherein releasing pressure applied on the actuator is transmitted via the shaft to the control of the motor assembly and engages the functionality of the motor assembly.

14. A system comprising:
   a housing comprising a front panel, the front panel comprising an opening;
   a motor assembly located inside the housing, the motor assembly comprising a control for alternatively engaging and disengaging a functionality of the motor assembly;

a printed circuit board (PCB) located inside the housing and defining an aperture for receiving a shaft, the PCB comprising one or more central processing unit (CPU), one or more memory and an electrical power circuit; and the shaft extending through the aperture of the PCB inside the housing, a first end of the shaft being adapted for actuating the control of the motor assembly, a second end of the shaft extending through the opening in the front panel of the housing and being adapted for receiving an actuator;

wherein the PCB is located between the motor assembly and the front panel of the housing, and the front panel comprises at least one control for controlling a component of the PCB.

15. The system of claim 14, wherein the at least one control for controlling a component of the PCB comprises a power control button for controlling activation of the electrical power circuit of the PCB.

16. The system of claim 14, wherein the at least one control for controlling a component of the PCB comprises a touchscreen allowing a user to control functionalities implemented by the one or more CPU of the PCB.

* * * * *